UNITED STATES PATENT OFFICE.

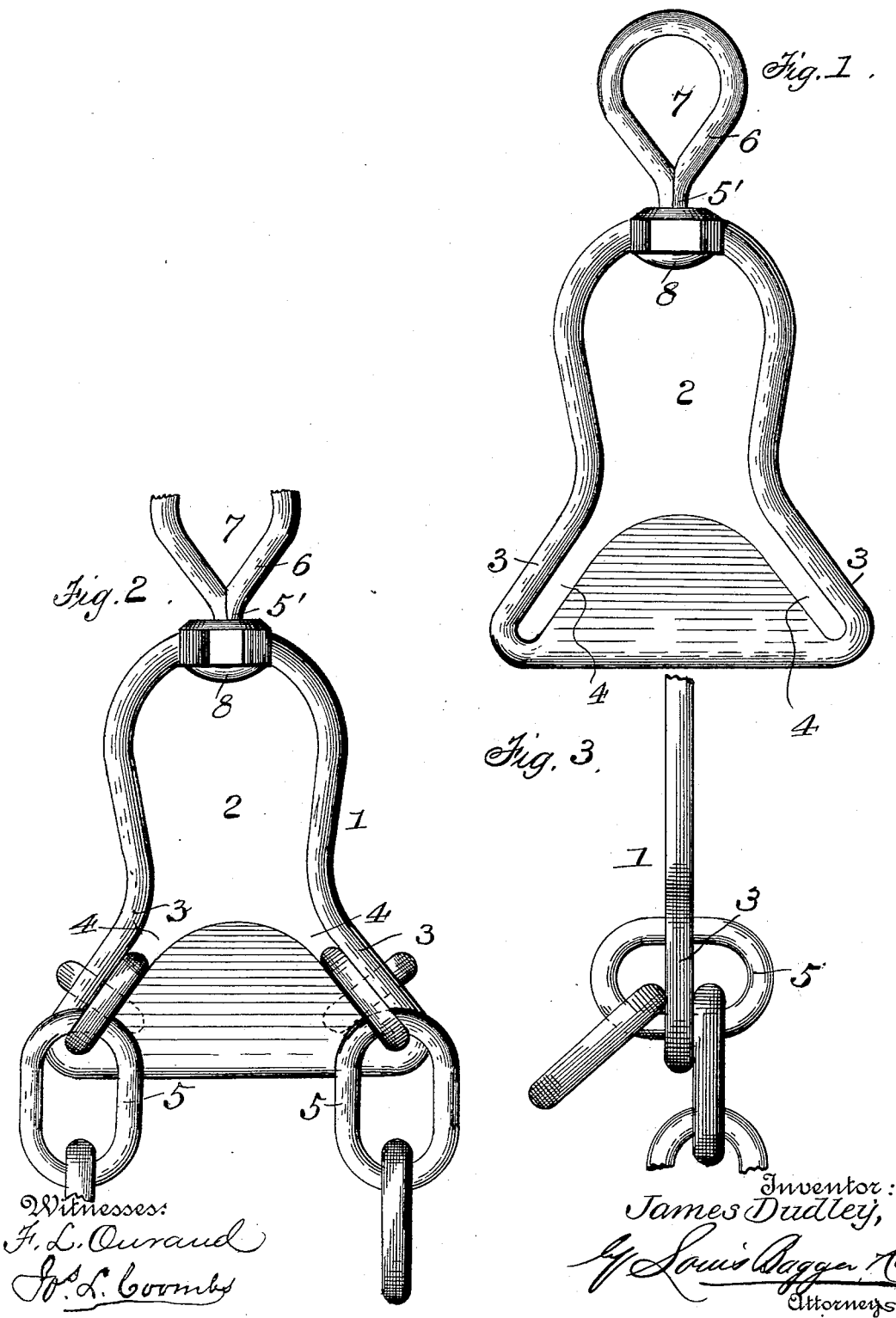

JAMES DUDLEY, OF KILLBUCK, OHIO.

GRAB FOR HOISTING-CHAINS.

SPECIFICATION forming part of Letters Patent No. 569,448, dated October 13, 1896.

Application filed November 27, 1895. Serial No. 570,285. (No model.)

*To all whom it may concern:*

Be it known that I, JAMES DUDLEY, a citizen of the United States, and a resident of Killbuck, in the county of Holmes and State of Ohio, have invented certain new and useful Improvements in Grabs for Hoisting-Chains; and I do hereby declare that the following is a full, clear, and exact description of the invention, which will enable others skilled in the art to which it appertains to make and use the same, reference being had to the accompanying drawings, which form a part of this specification.

My invention relates to an improvement in devices adapted to be used in connection with derricks and hoisting-machines, by means of which the usual hooks for engaging with a hoisting-chain are dispensed with. In the ordinary manner of using hooks and rings and hoisting-chains the hook and ring always pull sidewise, giving a twist to the chain, rendering it frequently necessary to take the chain off to remove the twist or the chain will break under an ordinary load.

The object of my invention is to remedy the above and other defects and provide a grab for derricks and other hoisting-machines by which a chain can be engaged therewith and centered in a rapid and efficient manner.

The invention consists in the novel construction of grab hereinafter fully described and claimed.

In the accompanying drawings, Figure 1 is an elevation of a grab constructed in accordance with my invention. Fig. 2 is a similar view showing a chain engaged with the grab. Fig. 3 is a detail side elevation.

In the said drawings the reference-numeral 1 indicates the grab, consisting of an endless band or ring bent to form a curved or horseshoe-shaped portion with two outwardly-extending portions 3 3, so bent as to form radial slots 4 4.

The numeral 5 designates a chain.

In using the device the ends of the chain are inserted through the portion 2 of the grab and two of the links of the chain engaged with the slots of the outwardly-extending portions 3 3. The chain will now be securely held by the adjoining inner links thereof and the chain will also be self-centering, so as to avoid the formation of twists.

At the upper end of the curved portion 2 is formed an apertured enlargement, in which is journaled the shank 5' of a swivel 6, consisting of a metal rod bent over to form an eye 7. The shank is formed with a head 8.

The grab can be readily connected with the hook of a hoisting-block by engaging the hook with the curved portion of the grab.

Having thus fully described my invention, what I claim is—

As an improved article a grab for a hoisting-chain, comprising the curved arms flaring outwardly at their lower ends in opposite directions, and formed integral with an inward-extending flat connecting-piece curved or rounded at its inner portion whereby outwardly-extending slots are formed, the walls of which are parallel with the boss or enlargement with which the upper ends of said arms are connected, the swivel consisting of a metal bar bent over to form a circular eye and the ends passed through said enlargement and provided with a head, substantially as described.

In testimony that I claim the foregoing as my own I have hereunto affixed my signature in presence of two witnesses.

JAMES DUDLEY.

Witnesses:
L. M. KANAVEL,
GEO. W. SHARP.